United States Patent Office 3,162,558
Patented Dec. 22, 1964

3,162,558
MOLDABLE EXOTHERMIC COMPOSITION
Harold F. Bishop, Donald E. Wiley, and Michael Bock II, Conneaut, Ohio, assignors to Exomet Incorporated, Conneaut, Ohio, a corporation of Ohio
No Drawing. Filed Apr. 25, 1963, Ser. No. 275,516
5 Claims. (Cl. 149—2)

This invention relates to exothermic compositions of the type to be formed into molds, riser sleeves, cores, hot-tops, pads, and the like, for use in casting such metals as iron, nickel, cobalt, copper, aluminum and their alloys, and provides an improved composition and article formed therefrom. The invention is particularly concerned with compositions comprising as the important components finely divided aluminum, an oxodizing agent, refractory material, and a resin that will set when heated to secure the other components in a rigid structure.

The composition of the invention comprises a special exothermic material, a thermosetting resin and refractory material. The exothermic composition can be molded to the desired shape, such as a mold, core, sleeve or hot-top, and then baked to set the resin and bind the particles together in a rigid structure. A preferred method of forming the articles is to mold them by the shell mold or shell core techniques.

The special exothermic material comprises relatively coarse aluminum particles, admixed metal oxides of iron and manganese, sodium chlorate, a non-fusible refractory material which provides a skeleton to maintain the shape of the article formed from the composition even after the exothermic reaction has been completed which confines the molten metal of the casting to the contoured surface of the article. The composition includes a suitable thermosetting resin and preferably an alkali fluoride compound such as potassium fluoborate or potassium zirconium fluoride.

An important feature of the composition is that it can be heated for a short time up to 700° F. without igniting which is due to the selection of the aluminum particle sizes. Due to the low concentration of sodium chlorate required the composition gives off much less gas than compositions containing sodium nitrate, and because of the permeability of the set composition such gas as is released does not contaminate the casting result in poor surfaces.

The following examples illustrated compositions of the invention:

TABLE I

|  | Preferred Percentage | Range, Percentage By Weight |
|---|---|---|
| Aluminum, particles | 29 | 18–40 |
| Refractory (Calamo 35) | 35.5 | 25–45 |
| MnO₂ | 2.5 | 0.25–10 |
| Iron Oxide (e.g. Fe₂O₃) | 19.5 | 5–30 |
| Sodium Chlorate | 2 | 0.1–8 |
| KBF₄ or K₂ZrF₆ | 2.25 | 0.1–8 |
| Thermosetting Resin | 9.25 | 3–18 |

Articles of the invention formed by the shell mold technique have desirable physical properties, for example, good tensile strength—75 p.s.i. minimum, an ignition temperature of about 2000° F., a reaction temperature of about 2950° F., and good permeability. Although these are approximate physical properties, it is important that the permeability be over 150.

The aluminum particles are relatively coarse and this is one reason why the composition can be heated to 700° F. for a short time without igniting. Although we prefer to use ground aluminum foil we may use other suitable aluminum particles such as grindings or atomized aluminum powder. It is preferred to use subdivided aluminum in the range of minus 30 mesh to plus 100 mesh. A preferred range of particle sizes and a preferred specific particle size analysis are shown in Table II.

It is important also to employ a refractory component having a particular particle size. Table II gives a typical analysis and a range of particle sizes for the material Calamo 35 which is a calcined fire clay. Other refractory materials may be used such as alumina, mullite, or magnesite grains. The refractory material should have a softening point not less than 3200° F. (34 PCE number).

TABLE II

*Screen Analysis*

| Tyler Screen | Calamo 35 | | Aluminum Particles | |
|---|---|---|---|---|
| | Typical Analysis | Range | Typical Analysis | Range |
| 20 | 1.0 | 0.5–3.0 | 0.5 | 0–3.0 |
| 35 | 54.5 | 40.0–70.0 | 12.0 | 7.0–17.0 |
| 50 | 23.5 | 15.0–35.0 | 22.0 | 15.0–30.0 |
| 65 | 15.0 | 8.0–23.0 | 25.5 | 18.0–33.0 |
| 80 | 2.5 | 1.5–4.0 | 10.0 | 6.0–14.0 |
| 100 | 1.0 | 0–3.0 | 9.0 | 6.0–14.0 |
| 150 | 1.0 | 0–3.0 | 11.5 | 6.0–18.0 |
| 200 | 0.5 | 0–3.0 | 6.0 | 3.0–10.0 |
| 250 | 0.0 | 0–3.0 | 0.5 | 0–3.0 |
| Through 250 | 1.0 | 0–3.0 | 3.0 | 0–6.0 |

The iron oxide may be either $Fe_2O_3$ or $Fe_3O_4$, a mixture thereof. A small amount of manganese dioxide is important because it liberates oxygen earlier than does red iron oxide or mill scale but later than sodium chlorate. The first oxygen entering the reaction is from the chlorate, then from the manganese dioxide and as the temperature becomes elevated oxygen is released from the iron oxide.

The invention also provides a composite article having a shell mold formed of said and a thermosetting resin as a rigid supporting structure or shell, and an attached rigid exothermic structure also formed by the shell mold technique. The sand mold structure can be similar to the kind now widely used and usually consists of foundry sand and from 3 to 10% of any suitable resin that will set to a hard state when heated.

In forming an exothermic article of the invention without a sand shell mold, the exothermic composition is poured over a mold pattern or poured into a mold cavity and then heated to set the resin. When the article includes a sand shell mold or supporting structure the exothermic composition is first poured over the mold pattern and then the sand-resin mixture is poured over the exothermic composition. In each case, the material is heated to a sufficient temperature to set the resin, for example to about 500° F. The resin first softens and thermosets or crosslinks to harden and bind the particles of sand. This shell mold is then stripped from the pattern. Various thermosetting resins such as the phenol formaldehyde, preferably powdered and containing a cross-linking agent such as hexamethylene tetramine, or urea formaldehyde or melamine formaldehyde resins may be used.

When the molded article, for example a mold, sleeve or core, is contacted by the molten metal and reaches a temperature of approximately 2000° F. the exothermic material will ignite and glow for an appreciable length of time, producing within itself a temperature of at least 3200° F. but will not melt. The articles are especially effective for use in casting gray iron, white iron, carbon steel and high alloy steels. The molded articles of the invention can be used to produce castings in very high yield.

The cast surface of the cast metal in contact with the molded article is as smooth as results from a normal sand surface. To further improve the casting surface a zircon or aluminum mold wash may be applied to the surface of the exothermic article which will be in contact with the molten metal.

The molded exothermic articles of this invention can be used to produce ingots in high yield; to preheat articles to be welded; to provide uniform heat for brazing as molds to cast refractory metals or alloys; and for annealing and stress relieving weldments.

This application is a continuation-in-part of application Serial No. 99,222, now Patent No. 3,103,719, filed March 29, 1961.

We claim:

1. An exothermic article molded in the shape of molds, riser sleeves, cores, hot-tops, pads, and the like for metal casting, said exothermic article being formed of a composition comprising

| | Range, percentage by weight |
|---|---|
| Aluminum, particles | 18–40 |
| Refractory particles | 25–45 |
| $MnO_2$ | 0.25–10 |
| Iron oxide | 5–30 |
| Sodium chlorate | 0.1–8 |
| Alkali fluoride | 0.1–8 |
| Thermosetting resin | 3–18 |

2. The device of claim 1 when formed by the shell mold technique and also by the shell core technique.

3. An article as defined in claim 1 in which the aluminum particles vary in size from minus 30 mesh to plus 100 mesh.

4. An exothermic composition comprising

| | Range, percentage by weight |
|---|---|
| Aluminum, particles | 18–40 |
| Refractory particles | 25–45 |
| $MnO_2$ | 0.25–10 |
| Iron oxide | 5–30 |
| Sodium chlorate | 0.1–8 |
| Alkali fluoride | 0.1–8 |
| Thermosetting resin | 3–18 |

5. An exothermic composition as defined in claim 4 in which the aluminum particles vary from minus 30 mesh to plus 100 mesh.

References Cited in the file of this patent

UNITED STATES PATENTS

| 2,261,221 | Bruner | June 3, 1940 |
| 2,968,542 | Brock | Jan. 17, 1961 |
| 2,973,713 | Burton | Mar. 7, 1961 |

UNITED STATES PATENT OFFICE
CERTIFICATE OF CORRECTION

Patent No. 3,162,558                 December 22, 1964

Harold F. Bishop et al.

It is hereby certified that error appears in the above numbered patent requiring correction and that the said Letters Patent should read as corrected below.

Column 1, line 45, after "casting" insert -- and --; line 47, for "illustrated" read -- illustrate --; column 2, TABLE II, under the heading "Tyler Screen" line 8 thereof, for "200" read -- 200- --; line 38, for "said" read -- sand --; column 3, line 5, before "be used" insert -- also --.

Signed and sealed this 4th day of May 1965.

(SEAL)
Attest:

ERNEST W. SWIDER                      EDWARD J. BRENNER
Attesting Officer                         Commissioner of Patents